United States Patent [19]
Sgambati et al.

[11] 3,798,953
[45] Mar. 26, 1974

[54] EXTRUSION PRESSES

[75] Inventors: Anthony P. Sgambati, Campbell, Ohio; Fred Kamena, Astor, Fla.; Robert L. Barton, Youngstown, Ohio; Donald J. Gliem, Fairport, N.Y.

[73] Assignee: Wean United Inc., Youngstown, Ohio

[22] Filed: Aug. 3, 1972

[21] Appl. No.: 277,651

[52] U.S. Cl. .................................. 72/255, 72/263
[51] Int. Cl. ............................................ B21c 23/00
[58] Field of Search ..................... 72/255, 260, 263

[56] References Cited
UNITED STATES PATENTS

| | | | |
|---|---|---|---|
| 3,391,564 | 7/1968 | Linnerz | 72/263 |
| 2,896,782 | 7/1959 | Billen | 72/255 |
| 2,954,869 | 10/1960 | Swanson | 72/263 |
| 2,530,669 | 11/1950 | Thornton | 72/260 |
| 3,354,686 | 11/1967 | Petsch | 72/255 |

*Primary Examiner*—Charles W. Lanham
*Assistant Examiner*—Robert M. Rogers
*Attorney, Agent, or Firm*—Michael Williams

[57] ABSTRACT

The invention is particularly directed to a die slide construction for an extrusion press, the slide having two die stations, either one of which may be moved to axial alignment with the container and ram of the press. One die station may have a die for extruding a billet to a uniform cross-section while the other station carries a step die for extruding a billet first to a predetermined cross-section and thereafter a larger cross-section. The invention enables the minor die to be removed from the major die with little time or effort. After the step extrusion is completed, the invention provides for exposure of the billet butt in line with a shear for removing the butt.

15 Claims, 12 Drawing Figures

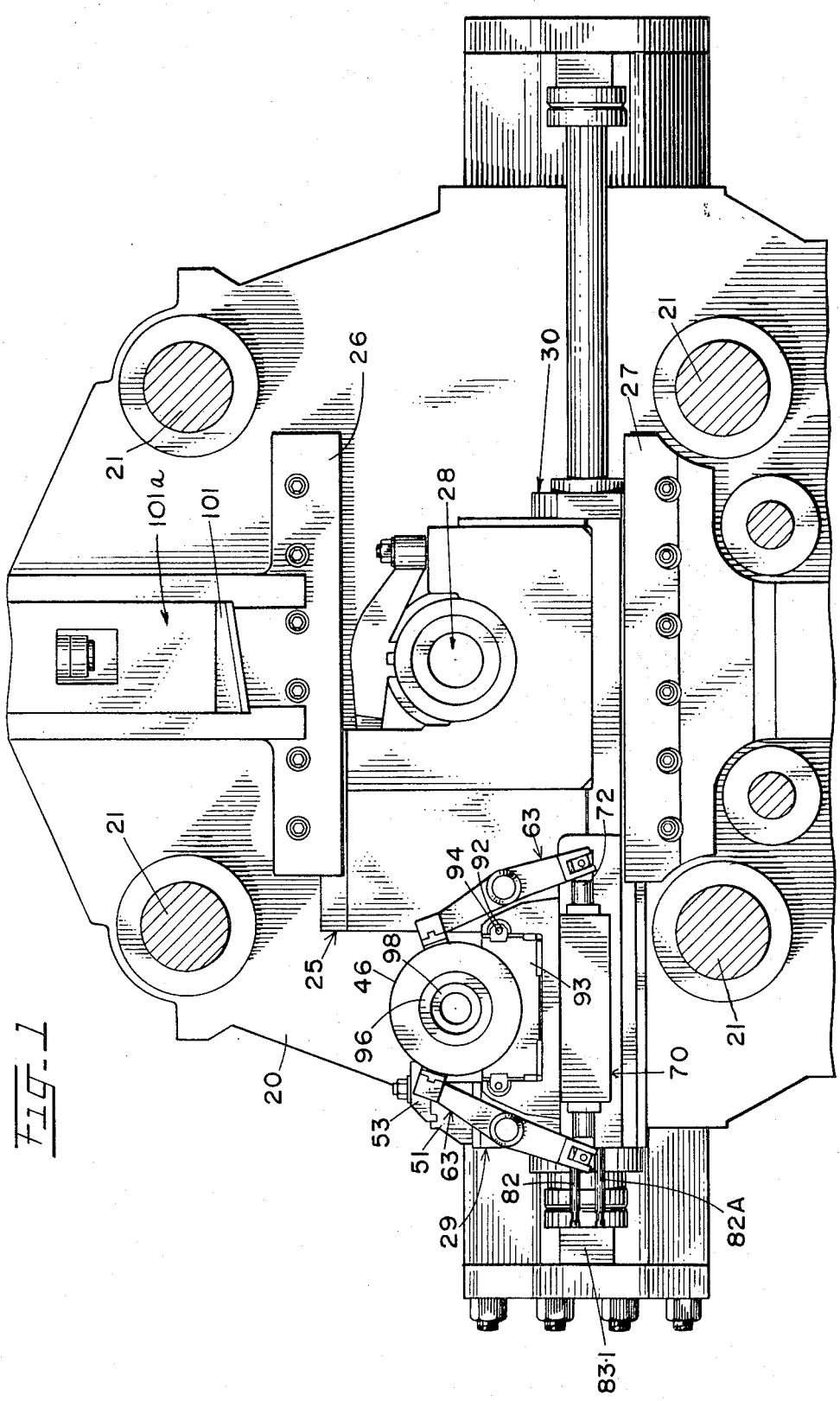

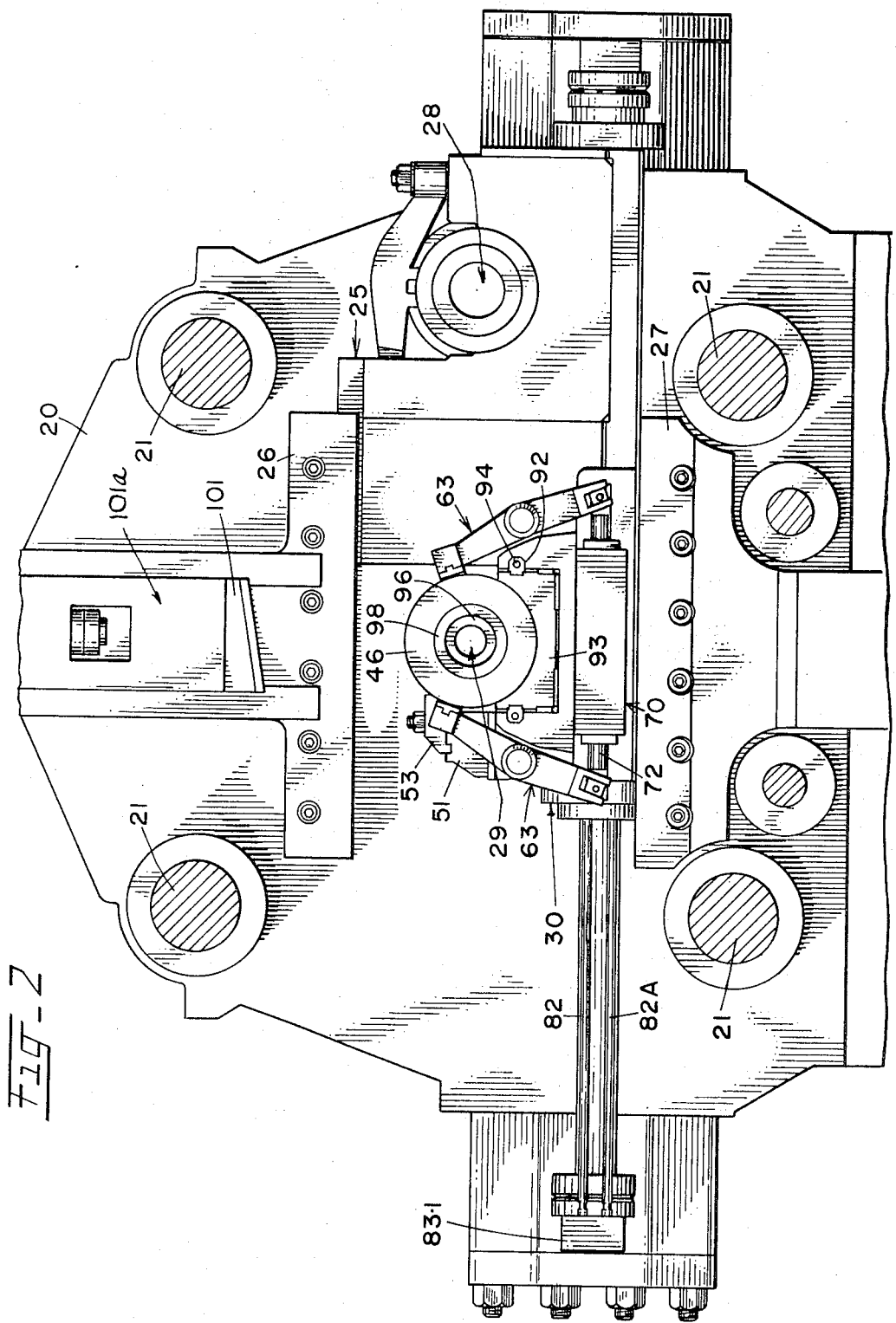

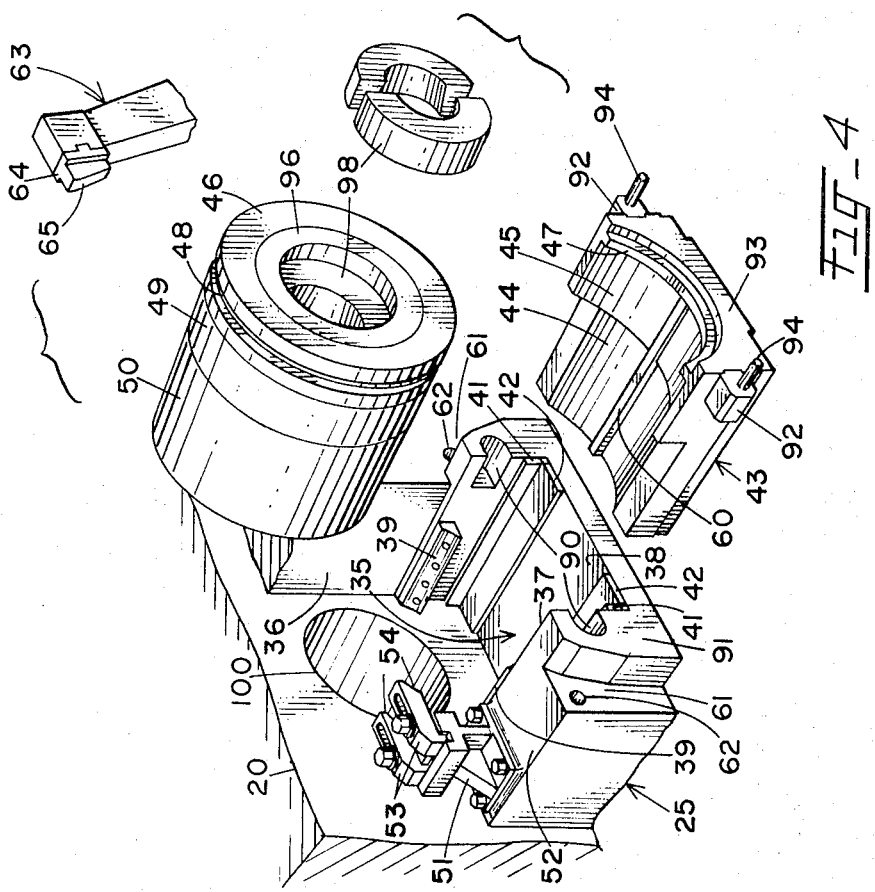
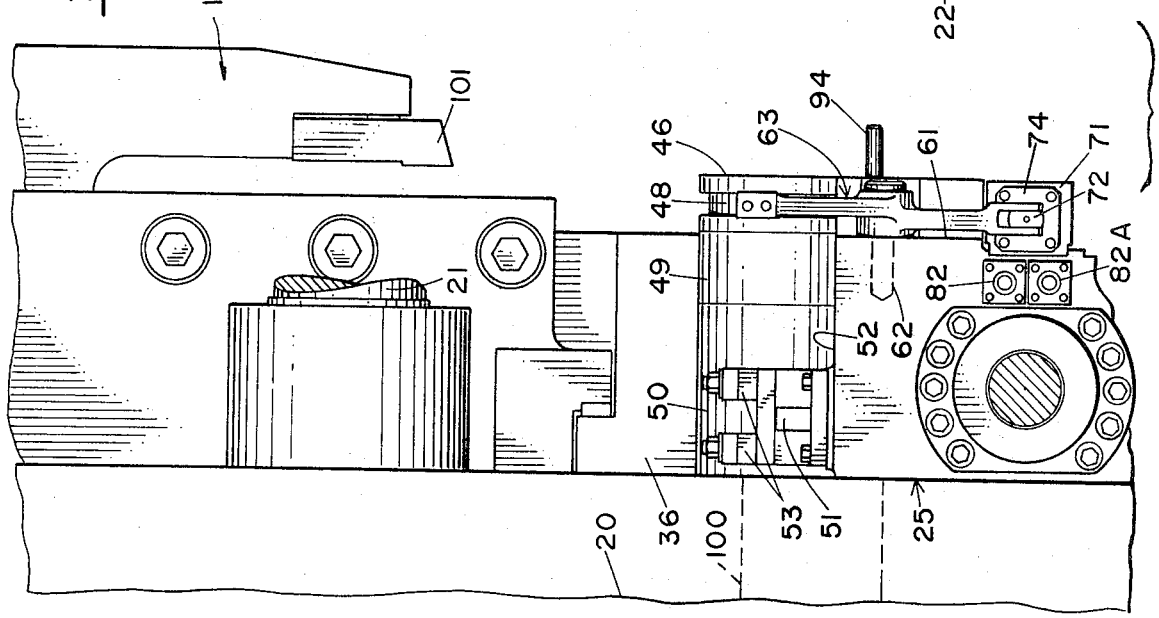

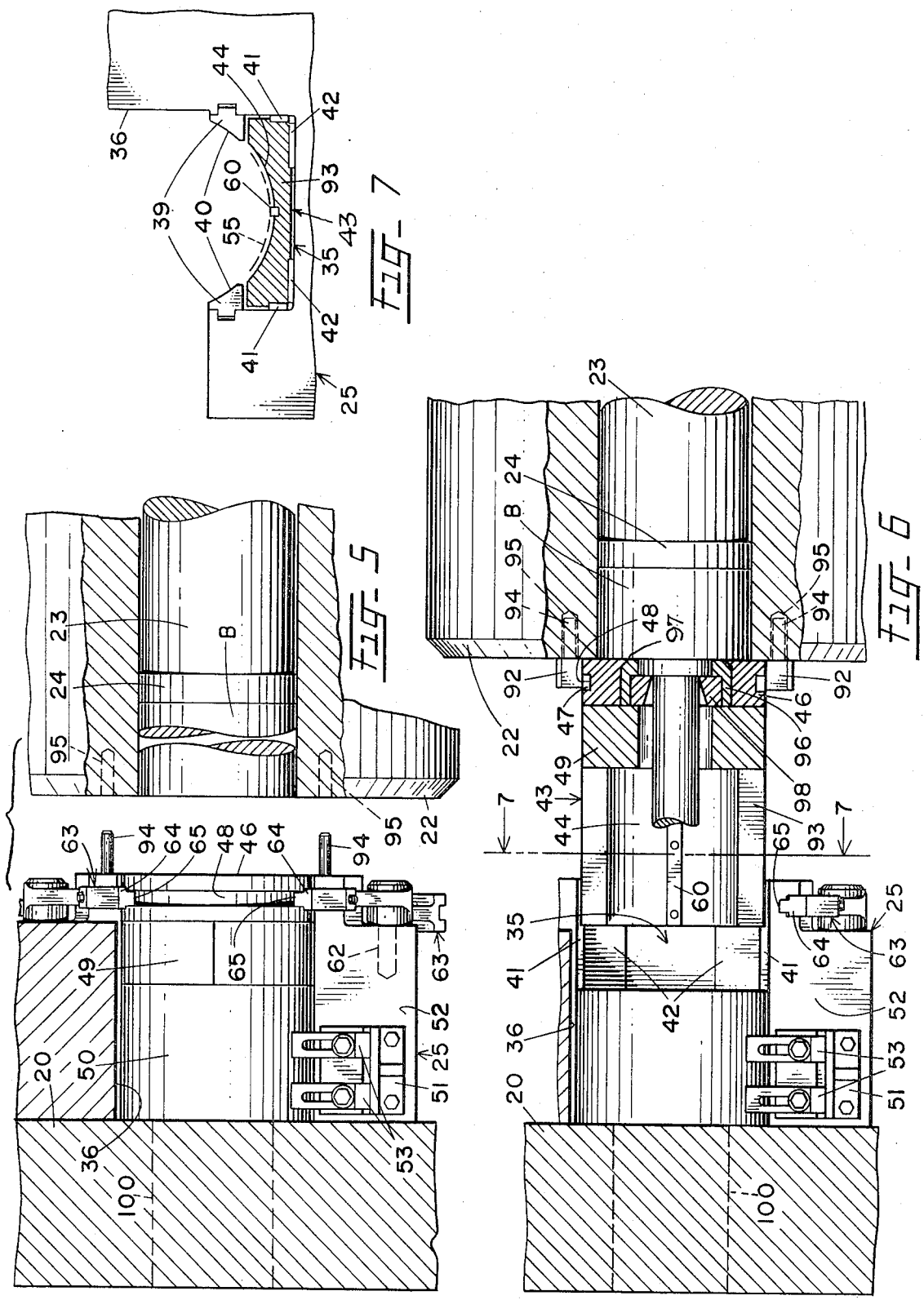

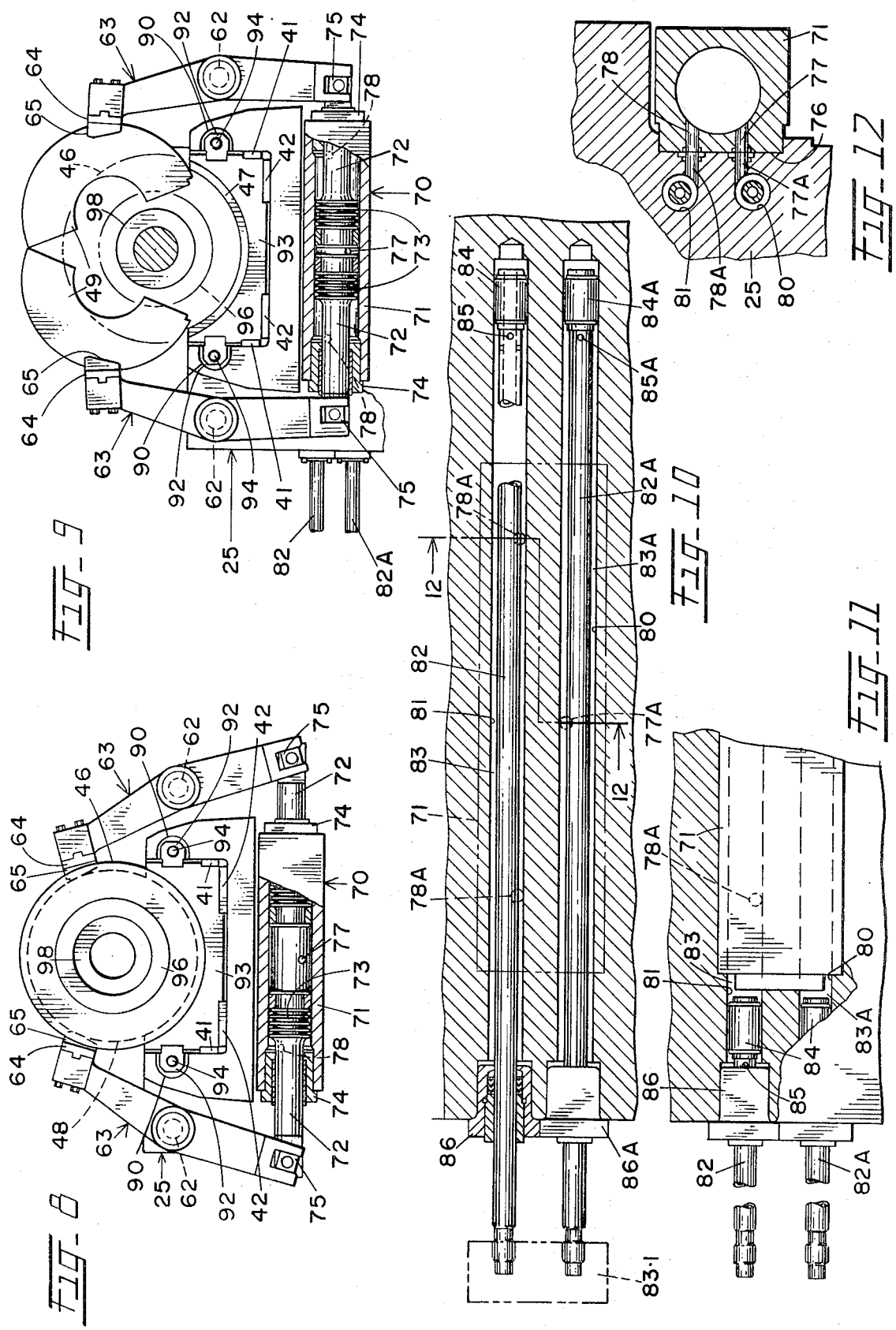

EXTRUSION PRESSES

BACKGROUND AND SUMMARY

Stepped extrusion processes are known, and a good description thereof appears in an article appearing in the Machine Design publication dated Dec. 21, 1967. However, apparatus for carrying out the stepped extrusion has required considerable time and labor in the removal of the minor die and the removal of the butt end of the billet from the extrusion, and the invention provides improvements to reduce such time and labor.

Briefly, the invention provides a step die carrier which is movably supported by the die carrier so that it and the die ring and locking bolster may be moved to a position wherein ready access may be had for the easy removal and replacement of the locking bolster. With the locking bolster replaced by one having an opening corresponding to the major die, the minor die is automatically removed by continued extrusion of the billet to the larger cross-section defined by the major die. Following the completion of the extruding process, the billet butt is exposed for shearing immediately adjacent to the surface of the die ring so that substantially all of the billet may be extruded, and thereby minimize waste.

DESCRIPTION OF THE DRAWINGS

In the drawings accompanying this description and forming a part of this application, there is shown, for purpose of illustration, an embodiment which the invention may assume, and in these drawings:

FIG. 1 is a fragmentary, transverse sectional view through an extrusion press, showing a face view of the extrusion platen and parts connected thereto, FIG. 2 is a view similar to FIG. 1 but showing parts in another position, FIG. 3 is a fragmentary side view of the apparatus shown in FIG. 1, FIG. 4 is a separated, perspective view of the step die carrier and related parts, FIG. 5 is a broken plan view of the step die carrier, showing the container and ram separated from the step die carrier, and the container in section, FIG. 6 is a view similar to FIG. 5, showing certain parts in section and the container in abutment with the step die carrier, FIG. 7 is a fragmentary sectional view corresponding generally to the line 7—7 of FIG. 6, FIG. 8 is a fragmentary, face view of the step die carrier, showing parts in one relation and certain parts in section, FIG. 9 is a view similar to FIG. 8, with parts in another relation, FIG. 10 is a fragmentary, longitudinal sectional view through the step die carrier, showing a hydraulic arrangement, in one position, FIG. 11 is a view similar to FIG. 10, showing the arrangement in another position, with parts broken away to conserve space, and FIG. 12 is a fragmentary sectional view corresponding generally to the line 12—12 of FIG. 10.

DESCRIPTION OF PREFERRED EMBODIMENT

The extrusion press embodying our invention may be of the type shown in U.S. Pat. Nos. 2,753,043 and 3,150,772 (both of which are assigned to the assignee of the present application) and therefore is only fragmentarily shown herein. Referring particularly to FIGS. 1 through 4, an extrusion platen 20 is carried by the bed (not shown) of a conventional extrusion press, tie rods 21 connecting a cylinder platen with the extrusion platen (the former also not being shown).

A billet container 22 (see FIG. 5) is carried by the machine bed for axial movement toward and away from the extrusion platen 20 in usual manner. A ram 23 (see FIG. 5) is suitably supported for movement through the container, the ram being reciprocated by the usual main extrusion cylinder. The ram is adapted to push against a dummy block 24 which in turn pushes the billet B through and outwardly of the container.

A die slide 25 is supported on the extrusion platen 20 for reciprocation transversely of the longitudinal axis of the ram. As seen in FIGS. 1 and 2, upper and lower brackets 26,27 are bolted to the front face of the platen 20 to provide guideways for the die slide 25. The slide is adapted to support dual die stations 28,29, the former supporting a die of uniform opening and the latter supporting a step die which will be described in detail hereinafter.

A hydraulic cylinder 30, which may be of the type shown in U.S. Pat. No. 3,150,772, is formed as part of the die slide 25 and has rod ends connected to the press bed for moving the die slide from the position seen in FIG. 1 to the position seen in FIG. 2, and back again. With the die slide 25 in the position of FIG. 1, the die station 28 is in position wherein its die is in axial alignment with the container 22 and the ram 23 for the extrusion of a billet to form a product of uniform cross-section throughout its length. In the event it is desired to form stepped extrusions, the cylinder 30 is powered to draw the die slide 25 to the right, as viewed in FIG. 2, so that the die station 29 is in axial alignment with the container 22 and ram 23.

As best seen in FIG. 4, the die slide 25, at the die station 29 has rectangular opening 35 providing sides 36,37 and a bottom 38. Sub bolster saddles 39 are bolted to opposite sides 36,37 and have arcuate facing surfaces 40 (see especially FIG. 7) for a purpose to appear. Liners 41,42 are bolted to the bottom 38 and the adjoining portions of the sides 36,37, and a step die carrier 43 slides along the liners. As best seen in FIG. 4, this carrier has off-set arcuate surfaces 44,45, the latter being struck on a slightly smaller radius than the former, for a purpose to appear. The surface 45 closely receives the lower portion of the cylindrical periphery of a die ring 46, and has a rib 47 to seat in an annular groove 48 in the die ring to locate the latter. The surface 45 also closely receives the lower portion of the cylindrical periphery of a locking bolster 49 which is in abutting relation with the rear side of the die ring 46.

A cylindrical sub bolster 50 is in abutting relationship with the rear of the locking bolster 49, and the lower portion of the periphery of the sub bolster 50 is supported by the sub bolster saddles 39,39. Again referring to FIG. 4, it will be seen that a bracket 51 is bolted to a pad extending slightly upwardly from a surface 52 of the die slide 25. A pair of bolster clamps 53 are bolted to the upper platform of the bracket 51, the free end of each clamp having an arcuate surface 54 which matches the cylindrical surface of the sub bolster 50. The clamps hold the sub bolster 50 firmly seated in the saddles 39,39. As seen by the dash lines 55 in FIG. 7, the radius of the sub bolster 50 is slightly less than that of the arcuate surface 44 so that this portion of the step die carrier may be slid under the sub bolster with ample clearance. A key 60 is provided along the arcuate surfaces 44,45, this key seating in keyways (not shown) in the die ring, locking bolster and sub bolster. The key has purpose only when the part to be extruded is not of uniform transverse section, in which case it is used to locate the parts in definite alignment.

Pivoted at 62 to surfaces 61,61 of the die slide are the intermediate portions of respective bell crank levers 63,63 (see FIGS. 4, 8 and 9). The upper ends of these levers are swingable toward and away from the die ring 46 and have pads 64 for engagement with the peripheral surface of the die, as seen in FIG. 8, to hold the latter seated in the arcuate surface 45 of the step die carrier. Each pad 64 has an extending rib 65 (see especially FIG. 4) which fits in the annular groove 48 in the die ring to hold it against axial movement. The levers 63,63 may be swung to the open position shown in FIG. 9 wherein the pads 64 are disengaged from the die ring.

A fluid cylinder 70 is provided for swinging the levers 63,63, and comprises a cylinder barrel 71 bolted to the die slide 25 and thus movable therewith. A pair of piston rods 72,72 are disposed within the barrel, each having an inner piston head 73 and outer ends extending through seals 74 carried by the barrel. The outer end of each piston rod 72 has a clevis connection 75 with the lower end of a respective bell crank lever 63.

As seen in FIG. 12, the cylinder barrel 71 is square in shape and has a side surface 76 sealed against a corresponding surface of the die slide 25. The barrel has a central transverse opening 77 (see FIGS. 8, 9 and 12) between the piston heads 72,72, and a pair of transverse openings 78,78 each between a piston head 73 and the related seal 74. Thus, fluid under pressure admitted through the central opening 77 will force the piston heads away from each other to cause the lever pads 64 to engage the die ring, as shown in FIG. 8. When fluid under pressure is admitted through each of the openings 78,78, and fluid is exhausted through central opening 77, the piston heads will be forced toward each other and thereby cause the lever pads to disengage the die ring, as shown in FIG. 9.

The die slide has three transverse openings 77a and 78a,78a (see FIG. 10) which match and communicate with the openings 77 and 78,78. The die slide opening 77a (see FIG. 12) extends transversely from an elongated bore 80 in the die slide 25, while the other two openings 78a,78a extend transversely from another elongated bore 81 in the die slide. The axis of the bores 80,81 are parallel and in the same direction of movement as that of the die slide.

Within and coaxial of the bore 81 is an elongated tube 82 whose outside diameter is less than the diameter of the bore to form an annular space 83 therebetween. The tube 82 has its outer end connected to a fluid entry block 83.1 which is carried by a stationary part of the extrusion apparatus, and therefore the tube 82 will be held stationary while the die slide moves to and from its two positions. A guide bearing 84 is connected to the inner end of the tube to close it and to guide it along the bore 80. A series of holes 85 are formed in the tube 82 near the guide bearing to equally distribute oil from within the tube to the annual space 83.

The tube 82 passes through a slide seal 86 carried by the die slide so that the bore 81 is sealed against leakage of oil. A similar tube is disposed within the bore 80 and the same reference numerals, but with the suffix a are used to designate the parts. The fluid entry block is connected to a suitable source of oil under pressure and a control valve (not shown but which may be of conventional design) is provided to control flow of oil under pressure to the interior of one tube while exhausting oil from the other tube. It will be appreciated that the construction just described will permit oil to be admitted to the cylinder barrel 71 in any position of the die slide 25.

As best seen in FIG. 4, the die slide 25 has facing pockets 90,90 which extend inwardly from its front surface 91 and the step die carrier 43 has side lugs 92,92 extending rearwardly from its front surface 93. The lugs 92 fit within respective pockets 90 when the step die carrier has been moved fully within the opening 35 of the die slide 25 to hold the step die carrier against vertical movement. Each lug 92 has a forwardly extending pin 94 adapted to fit within corresponding openings 95,95 (see FIGS. 5 and 6) in the adjoining face of the container 22, to maintain alignment of parts.

As seen in FIG. 6, a major die 96, having a cylindrical periphery, is closely received within a complementary axial opening in the die ring 46, the latter opening having an annular lip 97 to prevent the major die from moving in one direction. It will be understood that the locking bolster 49 will prevent the major die from moving in the opposite direction. A minor die 98 is contained within the major die opening and is clamped between the major die and the locking bolster.

In operation, the die ring 46, with major and minor dies therein, is seated, together with the locking bolster 49, within the arcuate surface 45 of the step die carrier 43, and this may be conveniently done while the step die carrier is extended forwardly from the die carrier 25. Thereafter, the step die carrier is pushed rearwardly so that the locking bolster abuts the sub bolster 50. The cylinder 70 is then actuated to swing the bell crank levers 63,63 to cause the pads 64 to press against the die ring with the ribs 65 seated in the annular groove in the die ring. The sub bolster 50, it will be appreciated, is clamped to the bolster saddles 39,39 by means of the bolster clamps 53 and therefore is unaffected by any change in position of the step die carrier.

As before mentioned, the die station 28 is used when work is to be extruded to a uniform cross-section throughout its length. When extruding operations in the die station 28 have been completed, or if no extruding has been performed in the die station, and it is intended to produce stepped extrusions, in either event the die slide 25 is moved from left to right, as viewed in FIG. 1, to move the die station 28 away from and move the die station 29 into, axial alignment with the container. Such movement is accomplished by proper actuation of the hydraulic cylinder 30. At any suitable time, the bell crank levers 63,63 are swung to position their ribs 65 within the annular groove in the die ring.

A heated billet B is deposited within the container 22 and the latter is moved toward the die slide so that its forward end abuts the die ring 46. In this position, the lugs 92,92 of the step die carrier will have been received in the openings 90 of the die slide and the pins 94,94 of the step die carrier 43 will be seated within the openings 95,95 in the forward end of the container. The ram 23 is then advanced through the container so that the dummy block 24 pushes the billet B outwardly of the container and through the minor die 98.

When a predetermined amount of metal has been extruded to the shape defined by the minor die, the clamp pads 64,64 are moved away from engagement with the die ring 46, as shown in FIG. 9, by proper energization of the hydraulic cylinder 70. The container 22 and ram 23 are then moved rearwardly a predetermined amount, as seen in FIG. 6. Since the hot metal sticks within the minor die, the step die carrier 43 is moved rearwardly with the container and the pins 94,94 remain seated within the container openings 95,95 to support and maintain proper location of the forward end of the step die carrier.

The locking bolster 49 is formed in sections, such as the clam shell section shown in FIG. 9, and may now be removed and replaced by a locking bolster having an opening larger than the opening in the major die 96. The container is then returned in a direction toward the die slide and this action moves the step die carrier rearwardly until the newly inserted locking bolster abuts the sub bolster 50.

The ram 23 is then advanced to continue the extrusion of the billet B, but the billet is now being extruded to the larger cross-section defined by the major die 96. The minor die will be engaged by the shoulder between the small and large cross-sections of the extrusion and will be moved, with the extrusion, through the openings in the newly inserted locking bolster, the sub boslter 50 and the delivery hole 100 (see FIGS. 5 and 6) in the platen 20. The minor die may be formed in sections, as shown in FIG. 4, so that it falls away or may be removed from the extrusion after it passes through the delivery hole.

The extruding process is continued until only a butt end remains within the container 22, whereupon extruding movement of the ram 23 is halted. The traverse cylinders are hydraulically locked at a position to provide sufficient reaction force to keep the die ring in the die slide while the container strip cylinders traverse the container, thus stripping the butt and dummy block from the container.

The extrusion plate 20 supports a shear 101a and a shear blade 101 (see FIGS 1, 2, and 3) for vertical reciprocation transverse to the axis of the die ring and closely over the face of the latter, and a hydraulic cylinder 102 moves the shear downwardly to shear the exposed butt end from the extrusion.

While the step die station 29 is in the extruding position the die station 28 which is clear of the extruding position may be inspected, repaired or replaced. Such latter die may then be again returned to extruding position for subsequent use and this will automatically move the step die to non-extruding position where it may be inspected, repaired, or replaced, for subsequent use.

We claim:

1. In an extrusion press having an extrusion platen cooperable with a billet container and extruding ram, the latter two being movable along an axis normal to a face of said platen, the improvement comprising:
   extruding die means,
   a support for the extruding die means, comprising a first portion connected to said platen and a second portion movably carried by said first portion for movement parallel to the above-mentioned axis,
   a die bolster fixed to said first portion, and
   a die ring fixed to said second portion, in one position of said second portion said die ring being positioned for back up by said bolster for extruding operation, and in another position of said second portion said die ring being spaced from said bolster.

2. The construction according to claim 1 wherein a sub bolster is fixed to said first portion in position coaxial with said axis,
   a locking bolster and die ring in face-to-face abutting relation and removably fixed to said second portion in position coaxial with said sub bolster,
   in one position of said second portion said locking bolster being positioned for backup by said sub bolster, and in another position of said second portion said locking bolster and die ring are spaced from said sub bolster whereby at least said locking bolster may be removed from said second portion.

3. In an extrusion press having an extrusion platen cooperable with a billet container and extruding ram, the latter two being movable along an axis normal to a face of said platen, the improvement comprising:
   a slide support fixed to said platen and extending from said face,
   a slide carried by said support for sliding movement toward and away from said face and parallel to the above-mentioned axis,
   a bolster locked in said slide support in position coaxial with said axis,
   and a die ring locked in said slide in position coaxial with said bolster and adapted to be backed up by the same when said slide has been moved to a position adjacent to said face, said slide in a position spaced from said face also spacing said die ring from said bolster.

4. In an extrusion press having an extrusion platen cooperable with a billet container and extuding ram, the latter two being movable along an axis toward and away from a face of said platen and coaxial with an extrusion delivery opening in the latter, the improvement comprising:
   a slide support carried by said platen and extending from said face,
   a slide carried by said support for sliding movement parallel to said axis from an inner position near said face to and outer position spaced from said face,
   a sub bolster locked in said slide support in position coaxial with said delivery opening,
   a locking bolster and a die ring carried by said slide in face-to-face relation and in position coaxial with said sub bolster, said die ring carrying major and minor step dies,
   said locking bolster having an opening corresponding to the smaller opening of the minor die and being adapted to abut said sub bolster and said die ring when said slide is in its inner position,
   said slide in its outer position spacing said locking bolster from said sub bolster whereby the former may be replaced by a locking bolster having an opening corresponding to the larger opening of the major die.

5. The construction according to claim 4 wherein said slide support is carried by a die slide which is held to sliding movement along said platen face, whereby said slide support may be moved transversely of said axis to and from position in working alignment with the delivery hole in said platen.

6. The construction according to claim 5 wherein said die slide supports plural die stations, one station being provided by said slide support, said slide and the parts carried thereby, movement of said die slide being operable to dispose one or the other of said die stations in working alignment with said delivery hole.

7. The construction according to claim 6 wherein the other die station comprises a die for extruding a billet to uniform cross-section.

8. The construction according to claim 5 wherein clamp means are carried by said die slide and are operable to clamp said die ring within said slide support.

9. The construction according to claim 8 wherein a fluid cylinder is carried by said die slide with its longitudinal axis parallel to the line of movement of said die slide, and fluid conduit means for delivery and exhausting fluid from said fluid cylinder and including means which are extended or retracted in accordance with movement of said die slide, said fluid cylinder including piston means and rod means for actuating said clamp means.

10. The construction according to claim 9 wherein said fluid conduit means comprise a pair of parallel bores within said die slide which extend parallel to the movement thereof, and a tube within each bore but of a smaller diameter to form an annular space therewith, said tubes having corresponding ends fixed within a manifold block carried by the frame of said press and opposite corresponding ends slidable within said bores, said annual spaces having port connections with the interior of said fluid cylinder.

11. The construction according to claim 4 wherein said major die is carried by said die ring and held thereby against axial movement outwardly of said die ring in a direction toward said container, said minor die being carried by said major die and held by the latter against axial movement in a direction toward said container, said locking bolster having an opening larger than the opening in said minor die and providing a shoulder to hold said minor die seated within said major die, said container being movable to engagement with a facing surface of said die ring and said ram being movable to extrude the billet within said container through said minor die, the friction of said billet portion within said container being sufficient to draw said slide to its outer position when said container is moved away from said platen surface, without disturbing the abutting relationship between said container and die ring, whereby said locking bolster may be replaced by one having the opening smaller than the opening in said major die and larger than the exterior size of said minor die, whereby upon subsequent movement of said container toward said platen surface to move said die slide to its inner position, said ram may continue its extruding force on said billet to extrude it through said major die, the step in said extrusion engaging said minor die and moving it through said locking bolster, said sub bolster and said delivery hole.

12. The construction according to claim 11 and further including clamp means for holding said die ring locked in said slide.

13. The construction according to claim 12 whereby said clamp means are engageable with said die ring only in the inner position of said slide.

14. The construction according to claim 13 wherein said clamp means comprises a pair of levers on opposite sides of said slide, each lever having an intermediate portion pivoted to said slide, one pair of corresponding ends being pivoted to corresponding rods extending outwardly from opposite ends of a fluid cylinder carried by said slide and the other pair of corresponding ends having clamp pads which are adapted to bear against a peripheral surface of said die ring to lock it within said slide.

15. The construction according to claim 14 wherein upon completion of the extrusion process said clamp pads are held engaged with said die ring to thereby hold said slide against movement from its inner position, whereby upon retraction of said container from said platen the butt end of the billet is withdrawn from said container, and a shear moveable transversely of said billet and across the face of said die ring to shear said butt end from the extrusion, said clamp pads retaining and stabilizing said die ring during the shearing operation.

* * * * *